UNITED STATES PATENT OFFICE.

ELIZABETH O'CONNOR, OF PHILADELPHIA, PENNSYLVANIA.

IMPROVEMENT IN BEE-HIVES.

Specification forming part of Letters Patent No. 119,991, dated October 17, 1871.

*To all whom it may concern:*

Be it known that I, ELIZABETH O'CONNOR, of the city of Philadelphia, State of Pennsylvania, have invented an Improvement in Bee-Hives, of which the following is a specification:

My invention relates to an improvement in the construction of hives for bees; and consists of a hive constructed in sections, and having the boxes composing these sections framed together with tongue and groove, or any known method of framing, and having the joints secured together by rods passing entirely through the hive longitudinally or transversely, which rods form, with nuts and screw-threads, complete screw-bolts.

In constructing my hive I use the tongue and groove-joint, which is, perhaps, the most complete method of jointing; but, instead of using screws or nails to secure these joints, I use rods of metal or other suitable material, having screw-threads in combination with heads, nuts, and washers, to form complete bolts to clamp together the sides and ends of the sections. In my hive I use four bolts or rods to a section, although more may be used, if necessary. The two lower bolts I use for the exclusive purpose of clamping the sides and ends together; but the two upper I use at a distance from the ends of the sections to serve as rests or bearings for the frames in which the honey-comb is formed, as well as to assist the lower bolts in clamping.

The advantages to be derived from this method of securing the joints of bee-hives are several and very important. Bee-hives, when acted upon by the elements, are liable to be opened in their joints, which fact is taken advantage of by moths and other insects destructive to bees to deposit their germ, which frequently proves, upon development, of serious consequences to the inmates of the hive. It is highly important also to have bee-hives constructed in such a manner as to retain as much of the animal heat as possible as a protection to the bees in winter from the cold, and to render more certain the hatching of the brood in the proper season. By means of my rods or bolts the joints of the hive may always be kept tight. Another advantage to be gained in using bolts is the ease and facility with which a hive may be put together or separated without damage to the parts for repairs, and packed for transportation or storage. The upper rods, while they assist in securing the joints, also serve the important office of support to the frames, and offer but a slight bearing-surface for the deposit of propolis or bee-glue. When a broad bearing is given to these frames it is frequently the case that the adhesion is so great that the frames are broken and the comb damaged in the act of withdrawing the loaded frames. These upper rods serve also as guides in withdrawing or inserting the frames, and preventing thereby the crushing of the bees that may be hanging to them.

The rods used in my hive are cylindrical, although their bearing-surfaces for the frames may be of any form that will give the least bearing.

In the accompanying drawing, Figure 1 is a longitudinal section on line $x\,x$. Fig. 2 is a plan. Fig. 3 is a side elevation.

Similar letters of reference are used in corresponding parts in all of the figures.

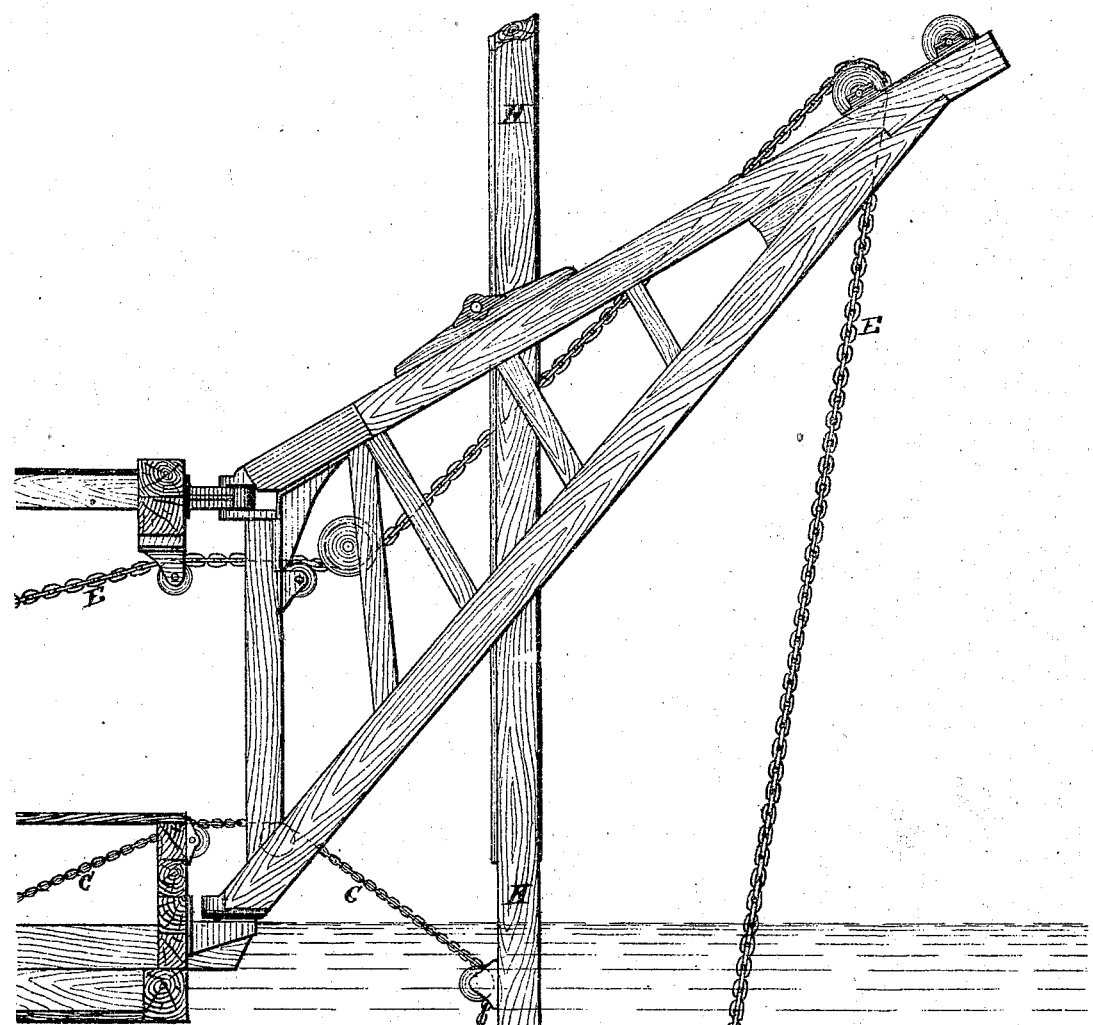

The sections of my hive I form of the sides A and ends B, jointed together with tongue-and-groove joints. D D, &c., are rods or bolts which pass transversely through the sections, and form, together with the heads $d$, nuts and washers $d'$, and screw-threads on the ends of the rods, complete screw-bolts to clamp the joints snugly together. The top or cover to the hive C is also jointed together with tongue-and-groove joints, and clamped with screw-bolts. D' D', &c., are rods or bolts similar in form to rods D, but serve the double purpose of clamping the joints of the sections, and forming supports to the frames E. F is the bottom or floor of the hive, which is also framed with tongue and groove. The opening $g$ is left between the floor and end B for the entrance and egress of the bees. The hive here illustrated and described is formed of two sections, one resting on the other, having rabbeted bearings, which form complete joints, and prevent a separation of the sections by any lateral movement. The hive may have more sections, if necessary, and the frames for the honey-comb may be the entire depth of the hive, if necessary. G is the honey-board, supported in a bevel-groove between the sections, but which may also be used